US011782334B2

(12) United States Patent
Lin et al.

(10) Patent No.: US 11,782,334 B2
(45) Date of Patent: Oct. 10, 2023

(54) ILLUMINATION SYSTEM AND PROJECTION APPARATUS

(71) Applicant: Coretronic Corporation, Hsin-Chu (TW)

(72) Inventors: Sheng-Chiang Lin, Hsin-Chu (TW); Chen-Wei Fan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/715,977

(22) Filed: Apr. 8, 2022

(65) Prior Publication Data

US 2022/0334458 A1 Oct. 20, 2022

(30) Foreign Application Priority Data

Apr. 16, 2021 (CN) ......................... 202120779760.2

(51) Int. Cl.
*G03B 21/20* (2006.01)
*G02B 27/10* (2006.01)
*G02B 5/30* (2006.01)

(52) U.S. Cl.
CPC ......... *G03B 21/204* (2013.01); *G02B 5/3083* (2013.01); *G02B 27/102* (2013.01)

(58) Field of Classification Search
CPC ......................... G03B 21/204; G03B 21/2066; G02B 5/3083; G02B 27/102; G02B 27/141; G02B 27/1053; G02B 27/283; G02B 26/008
See application file for complete search history.

(56) References Cited

U.S. PATENT DOCUMENTS

2020/0019049 A1* 1/2020 Liu ...................... G03B 21/204
2020/0073219 A1* 3/2020 Chen ...................... G02B 26/00
2022/0132086 A1* 4/2022 Liao ................... G03B 21/2066
2022/0171276 A1* 6/2022 Pan .................... G03B 21/2053

FOREIGN PATENT DOCUMENTS

CN 102929086 2/2015
CN 106200231 4/2018
CN 110874001 3/2020
EP 3594747 B1 * 5/2022 ............. G02B 27/10
TW 201907222 2/2019

* cited by examiner

*Primary Examiner* — Jong-Suk (James) Lee
*Assistant Examiner* — Glenn Zimmerman
(74) *Attorney, Agent, or Firm* — JCIPRNET

(57) ABSTRACT

An illumination system including an excitation light source, a wavelength converting element, and a region-based light splitter is provided. The excitation light source provides an excitation beam. The wavelength converting element is disposed on a transmission path of the excitation beam to convert the excitation beam into an excited beam. The region-based light splitter is disposed on the transmission path of the excitation beam and includes at least one first region and at least one second region. The first region reflects the excitation beam and allows the excited beam to pass through. The second region allows the excitation beam and the excited beam to pass through. The excitation beam reflected by the region-based light splitter is transmitted toward the wavelength converting element. A projection apparatus including the illumination system is also provided.

18 Claims, 13 Drawing Sheets

100D

ILLUMINATION SYSTEM AND PROJECTION APPARATUS

CROSS-REFERENCE TO RELATED APPLICATION

This application claims the priority benefit of China application serial no. 202120779760.2, filed on Apr. 16, 2021. The entirety of the above-mentioned patent application is hereby incorporated by reference herein and made a part of this specification.

BACKGROUND

Technical Field

The invention relates to an optical system and an electronic apparatus, and particularly relates to an illumination system and a projection apparatus.

Description of Related Art

A projection apparatus is a display apparatus which generates a large image, and the development thereof has been progressing as science and technologies evolve and innovate. In principle, the projection apparatus forms an image by converting an illumination beam generated by an illumination system into an image beam through a light valve and projecting the image beam onto a projection target (e.g., a screen or wall surface) through a projection lens to form a projection image.

The illumination system has also been evolving through coping with the market's requirements on brightness, color saturation, lifetime, environmental friendliness, etc., of the projection apparatus, and have adopted light sources from ultra-high-performance (UHP) lamps, light-emitting diodes (LEDs), to laser diode (LD) light sources used nowadays. The framework using a laser light source and phosphor is frequently used in the conventional light converging technologies. The designs of phosphor (wavelength converting element) include applications of a transmissive type and a reflective type. However, both types generate unexcited blue laser during a phosphor excitation process of the blue laser. During the phosphor excitation process of the blue laser, the blue laser cannot be fully excited with the phosphor, and the unexcited blue laser is then turned into heat.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides an illumination system and a projection apparatus capable of facilitating conversion efficiency and improving a display effect.

Other objects and advantages of the invention can be further illustrated by the technical features broadly embodied and described as follows.

In order to achieve one or a portion of or all of the objects or other objects, an embodiment of the invention provides an illumination system including an excitation light source, a wavelength converting element, and a region-based light splitter. The excitation light source provides an excitation beam. The wavelength converting element is disposed on a transmission path of the excitation beam to convert the excitation beam into an excited beam. The region-based light splitter is disposed on the transmission path of the excitation beam and includes at least one first region and at least one second region. The at least one first region reflects the excitation beam and allows the excited beam to pass through, the at least one second region allows the excitation beam and the excited beam to pass through, and the excitation beam reflected by the region-based light splitter is transmitted toward the wavelength converting element.

In order to achieve one or a portion of or all of the objects or other objects, an embodiment of the invention provides a projection apparatus including an illumination system, at least one light valve, and a projection lens. The projection system provides an illumination beam. The illumination system includes an excitation light source, a wavelength converting element, and a region-based light splitter. The excitation light source provides an excitation beam. The wavelength converting element is disposed on a transmission path of the excitation beam to convert the excitation beam into an excited beam. The region-based light splitter is disposed on the transmission path of the excitation beam and includes at least one first region and at least one second region. The at least one first region reflects the excitation beam and allows the excited beam to pass through, the at least one second region allows the excitation beam and the excited beam to pass through, and the excitation beam reflected by the region-based light splitter is transmitted toward the wavelength converting element. An illumination beam includes the excitation beam and the excited beam. The at least one light valve is disposed on a transmission path of the illumination beam to convert the illumination beam into an image beam. The projection lens is disposed on a transmission path of the image beam and projects the image beam out of the projection apparatus.

Based on the above, the embodiments of the invention at least exhibit one of the advantages or effects set forth in the following. In the illumination system and the projection apparatus according to the embodiments of the invention, the illumination system includes the excitation light source, the wavelength converting element, and the region-based light splitter. The region-based light splitter is disposed on the transmission path of the excitation beam, and includes at least one first region and at least one second region. The first region reflects the excitation beam and allows the excited beam to pass through, whereas the second beam allows the excitation beam and the excited beam to pass through. The excitation beam reflected by the region-based light splitter is transmitted toward the wavelength converting element. Therefore, when the excitation beam provided by the excitation light source is transmitted to the wavelength converting element but is not converted into the excited beam, the portion of the excitation beam which is not excited and converted passes through the focusing element and is transmitted to the first region located in the region-based light splitter at a large dispersion angle. Thus, the portion of the excitation beam is reflected by the first region and transmitted toward the wavelength converting element again to be excited and converted. By doing so, the portion of the excitation beam that is not excited and converted can be recycled, and the brightness of the excited beam is increased. As a result, the conversion efficiency is facilitated, and the display effect is improved.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
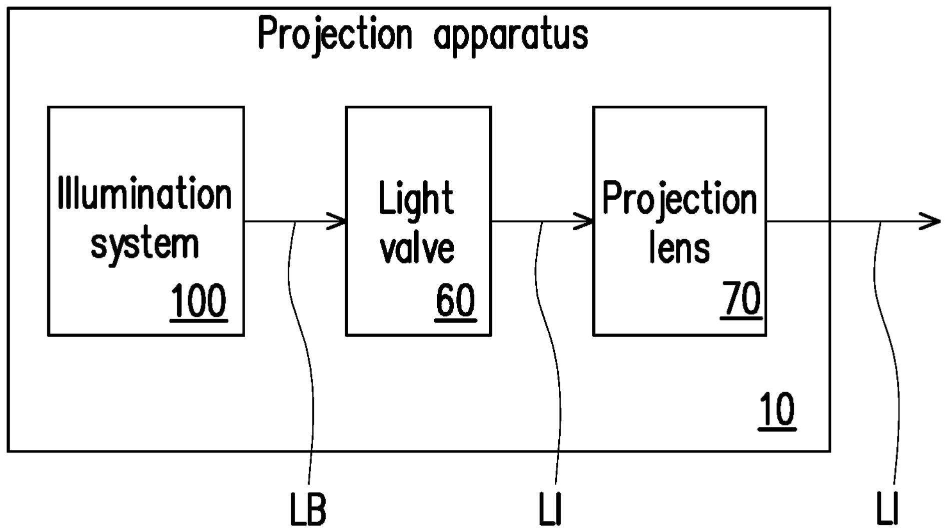
FIG. 1 is a schematic view illustrating a projection apparatus according to an embodiment of the invention.

FIG. 1 is a schematic view illustrating a projection apparatus according to an embodiment of the invention. Referring to FIG. 1, an embodiment of the invention provides a projection apparatus 10. The projection apparatus 10 includes an illumination system 100, at least one light valve 60, and a projection lens 70. The projection system 100 provides an illumination beam LB. The at least one light valve 60 is disposed on a transmission path of the illumination beam LB to convert the illumination beam LB into an image beam LI. The projection lens 70 is disposed on a transmission path of the image beam LI and configured to project the image beam LI out of the projection apparatus 10 to a projection target (not shown), such as a screen or a wall surface.

The projection system 100 provides the illumination beam LB. For example, the illumination system 100 includes one or more light emitting elements, a wavelength converting element, a light homogenizing element, a light filtering element, and/or a light splitting/converging element, and provides light of different wavelengths as the source of image light. However, the invention is not particularly limited by the type or the configuration of the illumination system 100 in the projection apparatus 10. Sufficient teachings, suggestions, and implementing details on the detailed structures and the embodiments thereof will be set forth in the following.

In the embodiment, the light valve 60 is, for example, a reflective light modulator, such as a liquid crystal on silicon (LCoS) panel, a digital micro-mirror device (DMD). In some embodiments, the light valve 60 may also be a transmissive light modulator, such as a transparent liquid crystal panel, an electro-optical modulator, a magneto-optic modulator, an acousto-optic modulator (AOM). The invention is not particularly limited by the configuration and the type of the light valve 60. Sufficient teachings, suggestions, and implementing details on how the light valve 60 converts the illumination beam LB into the image beam LI are readily available in conventional knowledge in the related technical field. Therefore, details in this regard will not be repeated in the following. In the embodiment, the number of the light vale 60 is one. For example, the projection apparatus 10 may use a single DMD. However, in other embodiments, the number of the light valve 60 may be plural. The invention is not particularly limited in this regard.

The projection lens 70 includes, for example, one or a combination of multiple optical lens elements with refractive power, such as various combinations of non-planar lens elements including a biconcave lens element, a biconvex lens element, a concave-convex lens element, a convex-concave lens element, a plane-convex lens element, and a plane-concave lens element. In an embodiment, the projection lens 70 may further include a planar optical lens element which projects the image beam LI from the light valve 60 to the projection target through reflection. The invention is not particularly limited by the configuration and the type of the projection lens 70.

Figure 2A:
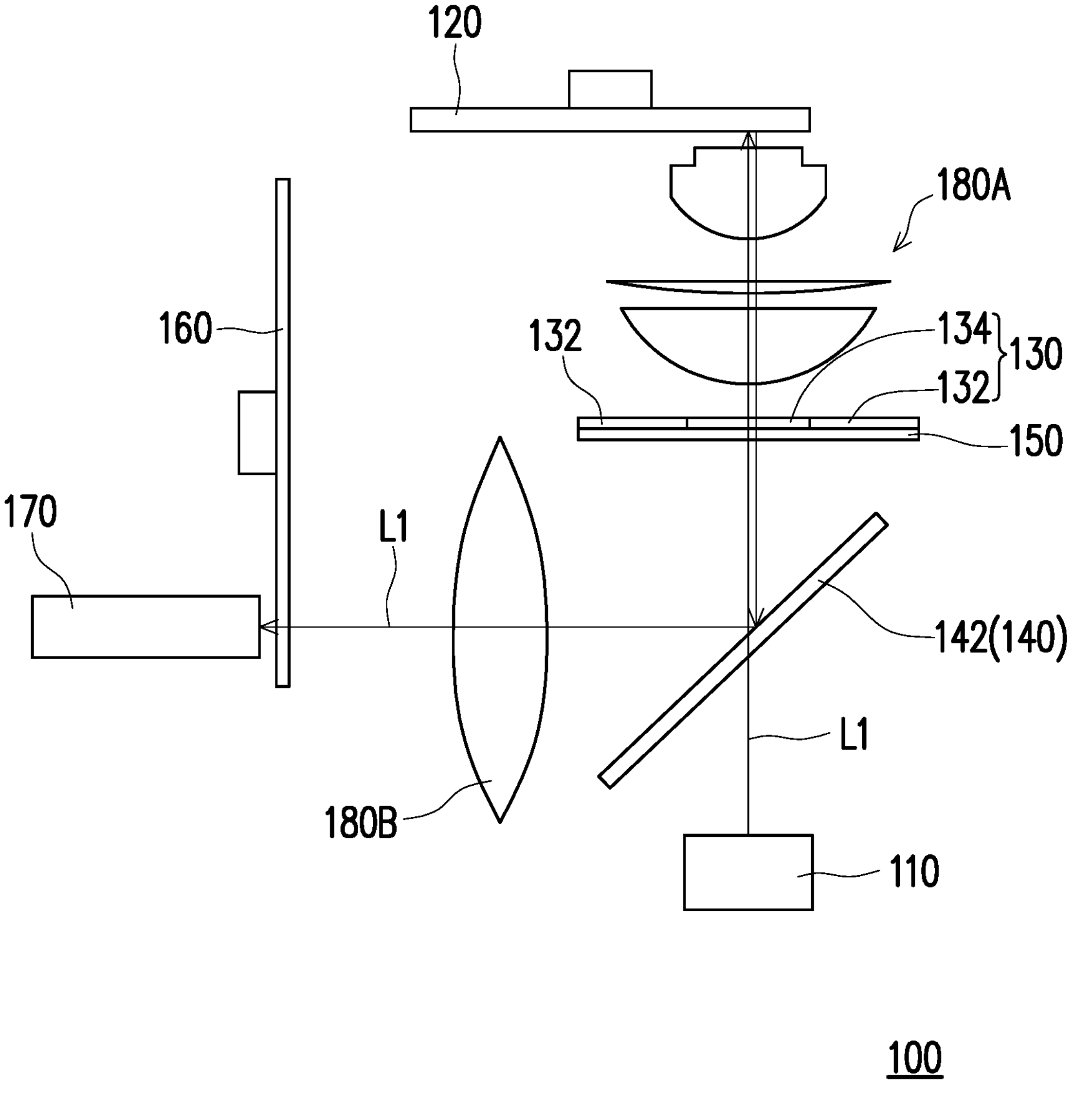
FIGS. 2A and 2B are respectively schematic views illustrating an illumination system according to an embodiment of the invention at different times.
Figure 2B:
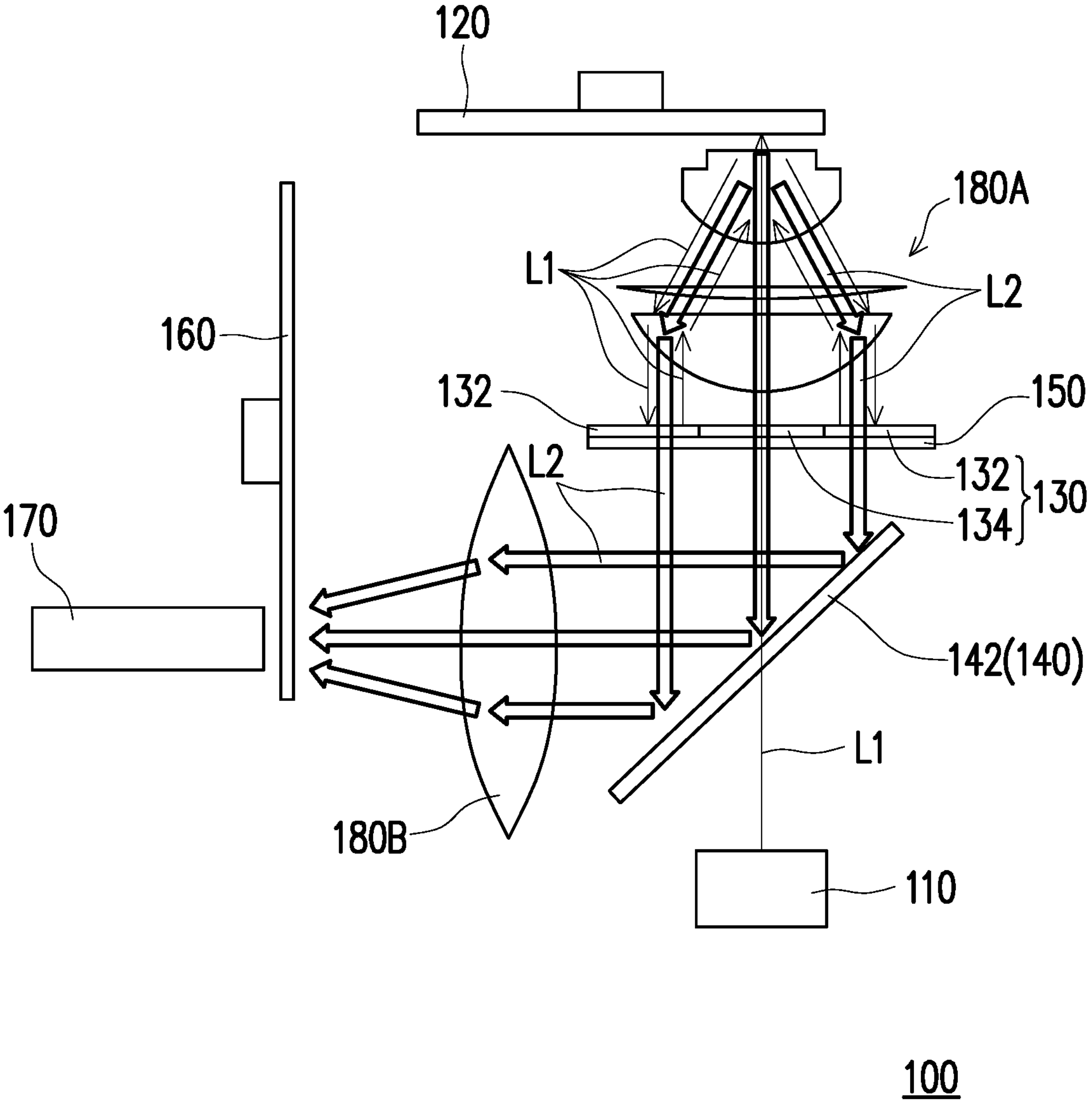

FIGS. 2A and 2B are respectively schematic views illustrating an illumination system according to an embodiment of the invention at different times. Referring to FIGS. 2A and 2B, in the embodiment, the illumination system 100 includes an excitation light source 110, a wavelength converting element 120, and a region-based light splitter 130. The excitation light source 110 is configured to provide an excitation beam L1. Specifically, the excitation light source 110 of the embodiment is a blue laser diode, and the excitation beam L1 is a blue beam, such as a blue beam with a dominant wavelength of 455 nm. However, the invention is not limited thereto. In the embodiment, the excitation beam L1 provided by the excitation light source 110 is a P-polarized blue beam. However, the invention is not limited thereto.

The wavelength converting element 120 is disposed on a transmission path of the excitation beam L1 to convert the excitation beam L1 into an excited beam L2. The wavelength converting element 120 has a wavelength conversion material (e.g., a phosphor material) capable of being excited to emit yellow light and green light, and the wavelength conversion material is adapted to convert the excitation beam L1, which is blue, into the excited beam L2, which is yellow-green. That is, the excited beam L2 includes a yellow beam and a yellow-green beam. However, the invention is not limited thereto. In the embodiment, the wavelength converting element 120 is a reflective wavelength conversion color wheel, and includes, for example, a yellow light conversion region, a yellow-green light conversion region, and a reflecting region disposed on a substrate. The reflecting region is provided with a reflective mirror, for example, and a reflective layer (not shown) is provided between the yellow light conversion region, the yellow-green light conversion region, and the substrate, or the substrate is a reflective metal substrate. However, the invention is not limited thereto.

Figure 3:
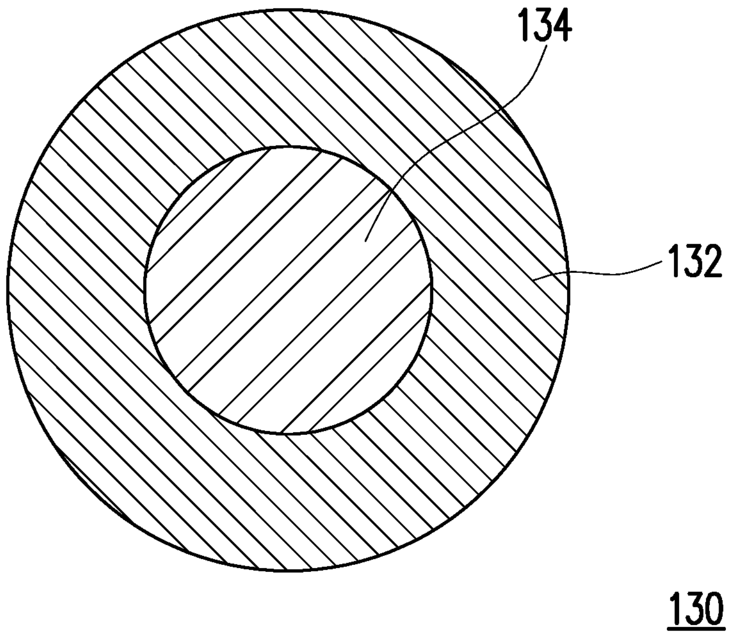
FIG. 3 is a schematic view illustrating a region-based light splitter of the illumination system of FIG. 2A.

FIG. 3 is a schematic view illustrating a region-based light splitter of the illumination system of FIG. 2A. Referring to FIGS. 2A and 3, the region-based light splitter 130 is disposed on the transmission path of the excitation beam L1, and is located between the excitation light source 110 and the wavelength converting element 120. The region-based light splitter 130 includes at least one first region 132 and at least one second region 134. Specifically, the first region 132 reflects the excitation beam L1 and allows the excited beam L2 to pass through. For example, in the embodiment, the first region 132 is a dichroic mirror with blue reflect (DMB). The second region 134 allows the excitation beam L1 and the excited beam L2 to pass through. For example, in the embodiment, the second region 134 may be transparent glass or air. In the embodiment, the number of the first region 132 of the region-based light splitter 130 is one, and the second region 134 is located at the center position of the region-based light splitter 130. In addition, the first region 134 surrounds the second region 134, as shown in FIG. 3.

Referring to FIGS. 2A and 2B again, in the embodiment, the illumination system 100 further includes a light splitting assembly 140 disposed on a transmission path of the excited beam L2 to reflect the excited beam L2. Specifically, in the embodiment, the light splitting assembly 140 includes a polarization light splitting element 142 which allows a P-polarized beam to pass through and reflects beams in other polarized states or non-polarized beams. However, the invention is not limited thereto.

In the embodiment, the illumination system 100 may further include a quarter-wave plate 150 disposed on the transmission path of the excitation beam L1 and configured to convert the polarized direction of the excitation beam L1. For example, since the excitation beam L1 provided by the excitation light source 110 of the embodiment is a P-polarized blue beam, the P-polarized excitation beam L1 may pass through the quarter-wave plate 150. In addition, in the embodiment, the quarter-wave plate 150 may be integrally formed with the region-based light splitter 130, such as being integrally formed through adhesion or coating. By doing so, the size of the illumination system 100 can be reduced.

In the embodiment, the illumination system 100 further includes a light filtering element 160, a light homogenizing element 170, and multiple focusing elements 180A and 180B.

The light filtering element 160 is disposed on the transmission paths of the excitation beam L1 and the excited beam L2 to generate red light, green light (or yellow light), and blue light by allowing the excitation beam L1 and the excited beam L2 to pass through at different times. Specifically, the light filtering element 160 includes a red light region, a green light region, and a transmissive region. The red light region allows a beam of a red wave band in the excited beam L2 to pass through, the green light region allows a beam of a green wave band in the excited beam L2 to pass through, and the transmissive region only allows the blue excitation beam L1 to pass through. In a different embodiment, the transmissive region may be replaced by a diffusion region to diffuse the excitation beam L1 which passes through. Alternatively, in a different embodiment, a yellow light region may be additionally provided for a beam of a yellow wave band in the excited beam L2 to pass through, thereby improving the display effect of the projection. However, the invention is not limited thereto.

The light homogenizing element 170 is disposed on transmission paths of the beams of the respective wavelengths passing through the light filtering element 160, and is configured to adjust the shape of the light spot to form the illumination beam LB. Accordingly, the shape of the light spot of the illumination beam LB output from the light homogenizing element 170 may cope with the shape (e.g., a rectangular shape) of the effective work region of the light valve 60, and the respective parts of the light spot may have consistent or close light intensities, thereby homogenizing the light intensity of the illumination beam LB. In the embodiment, the light homogenizing element 170 may be a light integration rod, for example. However, in other embodiments, the light homogenizing element 170 may also be an optical element of another appropriate type, such as a lens array like a fly eye lens array. Nevertheless, the invention is not particularly limited in this regard.

The focusing element 180B may be disposed between the light splitting assembly 140 and the light filtering element 160, and the focusing element 180A may be disposed between the wavelength converting element 120 and the region-based light splitter 130. The focusing elements 180B and 180A transmit the beams which pass through to focus the beams while the beams are passing through. The focusing elements 180A and 180B each include, for example, one or a combination of multiple optical lens elements with refractive power, such as various combinations of non-planar lens elements including a biconcave lens element, a biconvex lens element, a concave-convex lens element, a convex-concave lens element, a plane-convex lens element, and a plane-concave lens element. Nevertheless, the invention is not particularly limited in this regard.

Referring to FIGS. 2A and 2B again, In the embodiment, the excitation beam L1 provided by the excitation light source 110 is sequentially transmitted through the light splitting assembly 140, the quarter-wave plate 150, and the second region 134 located at the center of the region-based light splitter 130 to arrive at the wavelength converting element 120.

At the time of blue light, the reflecting region in the wavelength converting element 120 reflects the excitation beam L1. The reflected excitation beam L1 sequentially passes through the region-based light splitter 130 and the quarter-wave plate 150, and the P-polarized excitation beam L1 is converted into the S-polarized excitation beam L1. Since the excitation beam L1 transmitted from the wavelength converting element 120 toward the region-based light splitter 130 has a smaller dispersion angle, such excitation beam L1 may be transmitted through the second region 134 located at the center of the region-based light splitter 130, and be sequentially transmitted through the light filtering element 160 and the light homogenizing element 170 after being reflected by the light splitting assembly 140.

At the time of non-blue light, the region with the wavelength conversion material in the wavelength converting element 120 converts the excitation beam L1 and reflects the converted beam to emit the non-polarized excited beam L2. The excited beam L2 may be transmitted through the first region 132 and the second region 134 of the region-based light splitter 130 and the quarter-wave plate 150, and may be sequentially transmitted through the light filtering element 160 and the light homogenizing element 170 after being reflected by the light splitting assembly 140.

At the time of non-blue light, a small portion of the excitation beam L1 transmitted to the wavelength converting element 120 is incident to the region with the wavelength conversion material but not excited. Therefore, the portion of the excitation beam L1 which is not excited and converted is reflected to pass through the focusing element 180A along the original path and transmitted to the first region 132 on the periphery of the region-based light splitter 130 at a large dispersion angle. Thus, the portion of the excitation beam L1 is reflected by the first region 132 and transmitted toward the wavelength converting element 120 again to be excited and converted. By doing so, the portion of the excitation beam L1 that is not excited and converted can be recycled, and the brightness of the excited beam L2 is increased. As a result, the conversion efficiency is facilitated, and the display effect is improved.

Figure 4:
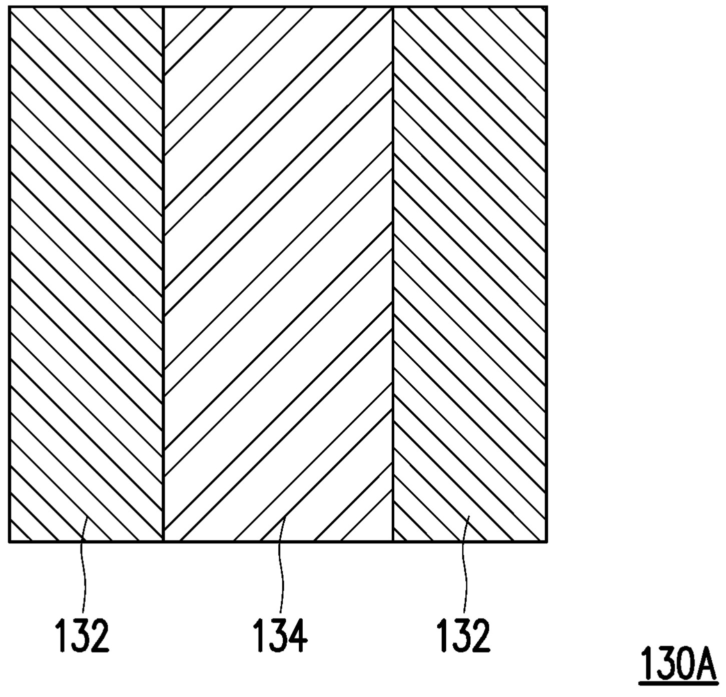
FIG. 4 is a schematic view illustrating a region-based light splitter according to an embodiment of the invention.

FIG. 4 is a schematic view illustrating a region-based light splitter according to an embodiment of the invention. Referring to FIG. 4, in another embodiment, a region-based light splitter 130A shown in FIG. 4 may replace the region-based light splitter 130 shown in FIG. 3. Specifically, in the embodiment, the region-based light splitter 130A is rectangular, the number of the first region 132 is two, the number of the second region 134 is one, and the second region 134 is located between the two first regions 132, as shown in FIG. 4. Nevertheless, the invention is not limited thereto. In addition, the second region 134 located at the center of the region-based light splitter 130A is disposed on the transmission path of the excitation beam L1 of the excitation light source 110. By doing so, the difficulty in manufacturing the region-based light splitter 130A is reduced.

Figure 5A:
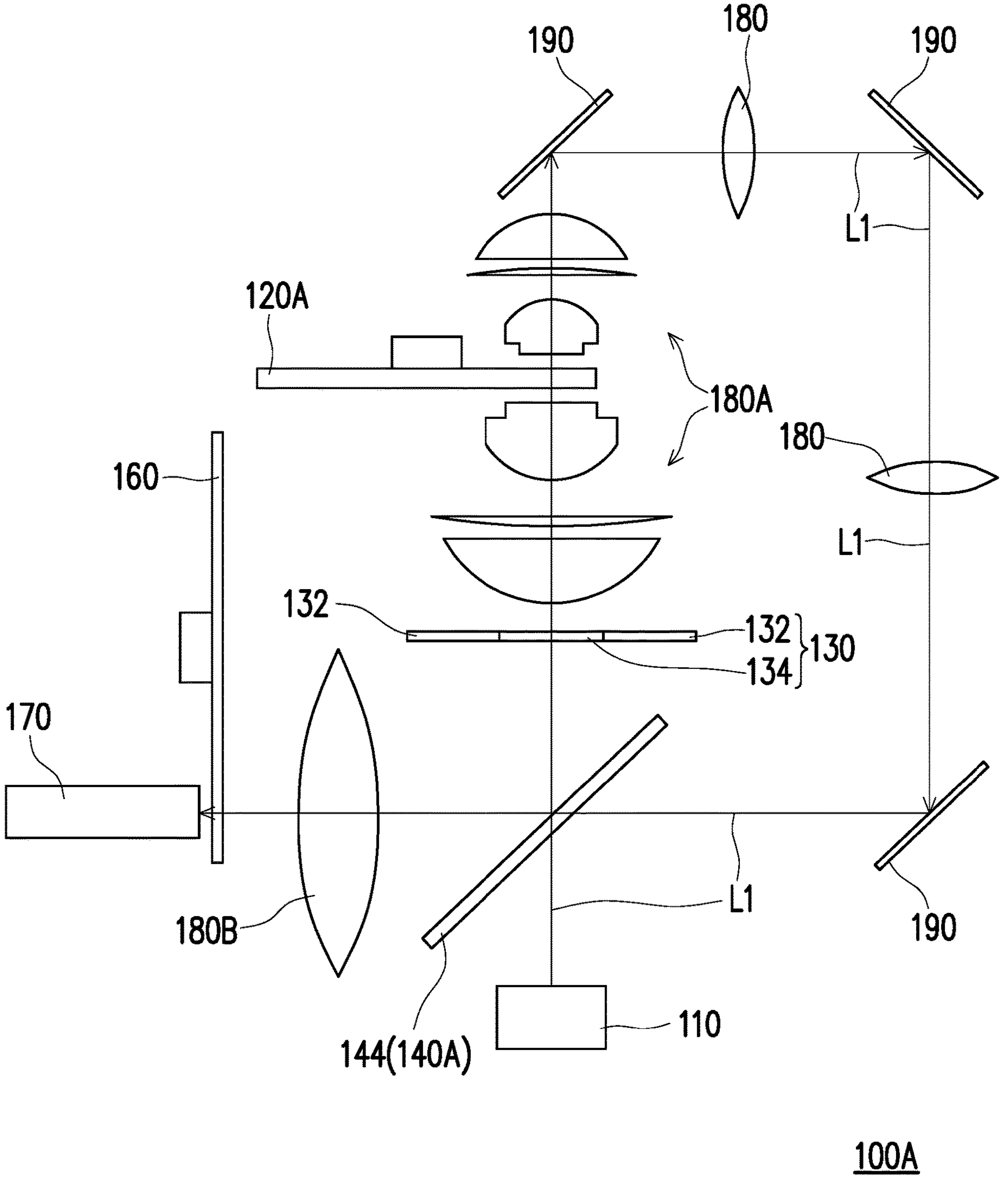
FIGS. 5A and 5B are respectively schematic views illustrating an illumination system according to another embodiment of the invention at different times.
Figure 5B:
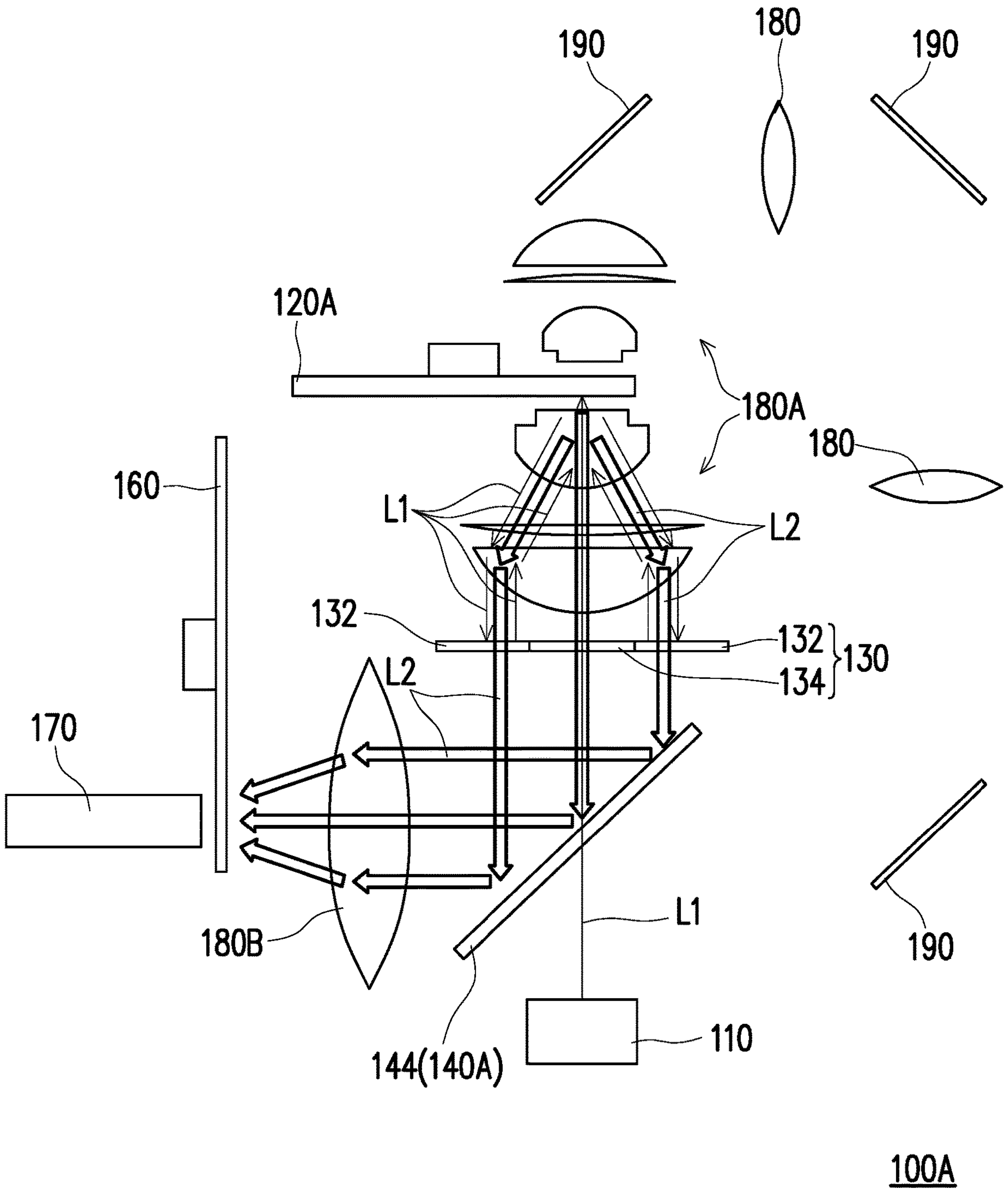

FIGS. 5A and 5B are respectively schematic views illustrating an illumination system according to another embodiment of the invention at different times. Referring to FIGS. 5A and 5B, an illumination system 100A of the embodiment is similar to the illumination system 100 shown in FIGS. 2A and 2B. However, the two differ in that, in the embodiment, a wavelength converting element 120A allows the excitation beam L1 of the excitation light source 110 to pass through, and a light splitting assembly 140A includes a light splitting element 144 allowing the excitation beam L1 to pass through and reflecting the excited beam L2. Specifically, in the embodiment, the wavelength converting element 120A is a transmissive wavelength conversion color wheel. What differs from the wavelength converting element 120 shown in FIG. 2A is that the wavelength converting element 120A includes, for example, a yellow light conversion region, a yellow-green light conversion region, and a transmissive region disposed on a transparent substrate. In the wavelength converting element 120A, the transmissive region replaces the reflective region, and the transmissive region may be, for example, a hollow region of the transparent substrate or a region with an anti-reflection film (not shown). In addition, a reflective layer (not shown) is provided between the yellow conversion region, the yellow-green conversion region, and the substrate, for example. The light splitting element 144 may be a dichroic mirror with yellow reflect (DMY), a dichroic mirror with green and orange reflect (DMGO), or a dichroic mirror with green and red reflect (DMGR). The light splitting element may be disposed in correspondence with the wavelength conversion material disposed in the wavelength converting element 120A.

Specifically, the excitation beam L1 provided by the excitation light source 110 is sequentially transmitted through the light splitting assembly 140A and the second region 134 located at the center of the region-based light splitter 130 to arrive at the wavelength converting element 120A. At the time of blue light, the excitation beam L1 is transmitted through the transmissive region in the wavelength converting element 120A, transmitted back to the light splitting assembly 140A through a combination of the focusing elements 180 and multiple reflecting elements 190 (e.g., reflecting mirrors), and then sequentially transmitted through the light splitting assembly 140A, the light filtering element 160, and the light homogenizing element 170.

At the time of non-blue light, the region with the wavelength conversion material in the wavelength converting element 120A converts the excitation beam L1 and reflects the converted beam to emit the excited beam L2. The excited beam L2 is transmitted through the first region 132 and the second region 134 of the region-based light splitter 130, and is sequentially transmitted through the light filtering element 160 and the light homogenizing element 170 after being reflected by the light splitting assembly 140A.

At the time of non-blue light, a small portion of the excitation beam L1 transmitted to the wavelength converting element 120A is incident to the region with the wavelength conversion material but not excited. Therefore, the portion of the excitation beam L1 which is not excited and converted is reflected to pass through the focusing element 180A and transmitted to the first region 132 on the periphery of the region-based light splitter 130 at a large dispersion angle. Thus, the portion of the excitation beam L1 is reflected by the first region 132 and transmitted toward the wavelength converting element 120A again to be excited and converted. By doing so, the portion of the excitation beam L1 that is not excited and converted can be recycled, and the brightness of the excited beam L2 is increased. As a result, the conversion efficiency is facilitated, and the display effect is improved. In addition, the quarter-wave plate 150 shown in FIG. 2A may be omitted.

Figure 6A:
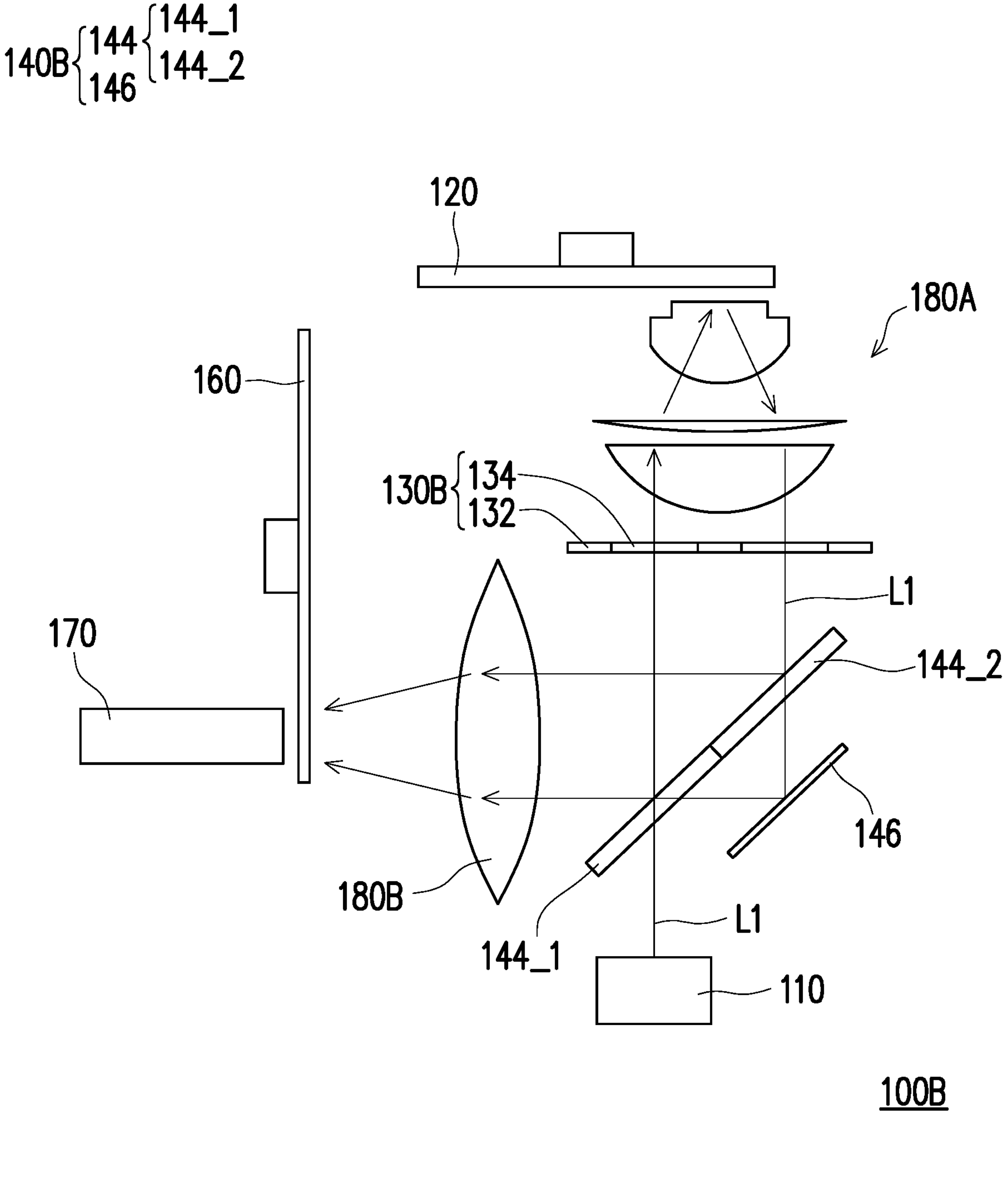
FIGS. 6A and 6B are respectively schematic views illustrating an illumination system according to another embodiment of the invention at different times.
Figure 6B:
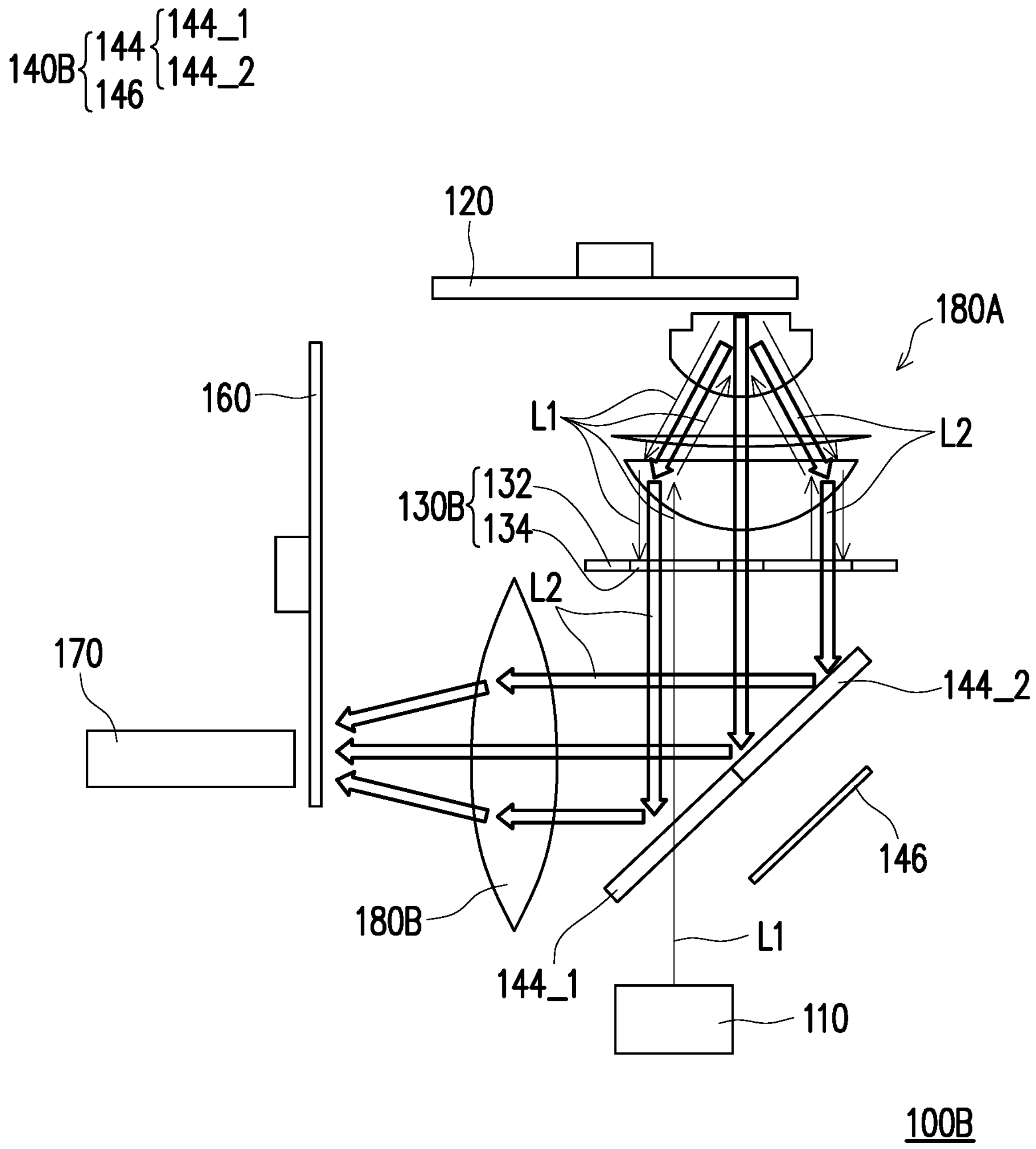
Figure 7:
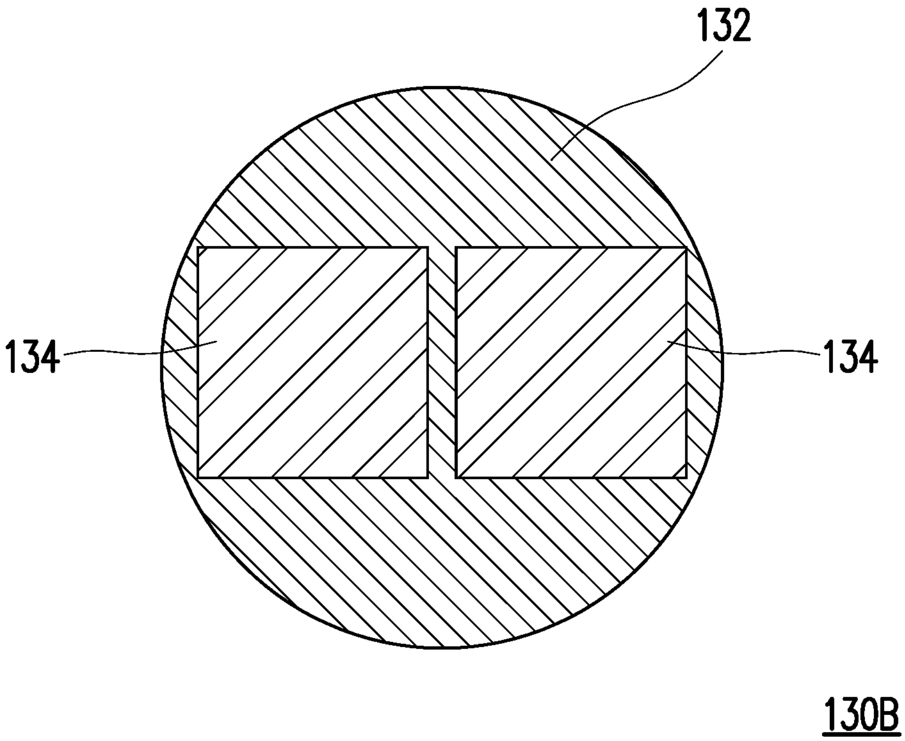
FIG. 7 is a schematic view illustrating a region-based light splitter of the illumination system of FIG. 6A.

FIGS. 6A and 6B are respectively schematic views illustrating an illumination system according to another embodiment of the invention at different times. Referring to FIGS. 6A and 6B, an illumination system 100B of the embodiment is similar to the illumination system 100 shown in FIGS. 2A and 2B. However, the two differ in that, in the embodiment, a light splitting assembly 140B includes the light splitting element 144 and a reflecting element 146. The light splitting element 144 includes a light splitting region 144_1 and a semi-reflective region 144_2 adjacent to the light splitting region 144_1. The light splitting region 144_1 of the light splitting element 144 allows the excitation beam L1 to pass through and reflects the excited beam L2. For example, the light splitting region 144_1 may reflect the DMY or the DMGO and allow blue light to pass through. The semi-reflective region 144_2 of the light splitting element 144 allows a portion of the excitation beam L1 to pass through, reflects another portion of the excitation beam L1, and reflects the excited beam L2. For example, the semi-reflective region 144_2 is, for example, a 50% semi-reflective mirror in combination with a dichroic coating film with yellow reflect or in combination with a dichroic coating film with green and orange reflect. The 50% semi-reflective mirror of the semi-reflective region 144_2 reflects a portion of blue light and allows a portion of blue light to pass through. The reflecting element 146 reflects and transmits the beam passing through the semi-reflective region 144_2 and transmits the beam toward the light splitting region 144_1. FIG. 7 is a schematic view illustrating a region-based light splitter of the illumination system of FIG. 6A. Referring to FIGS. 6A and 7, in the embodiment, the number of the second region 134 of the region-based light splitter 130B is two, and the two second regions 134 are spaced apart. In addition, the light splitting region 144_1 and the semi-reflective region 144_2 of the light splitting element 144 respectively correspond to the two second regions 134 of the region-based light splitter 130B on an optical path, as shown in FIGS. 6A and 6B. Specifically, in the embodiment, the two second regions 134 of the region-based light splitter 130B are symmetric to the geometric symmetric axis of the region-based light splitter 130B, and the first region 132 surrounds the two second regions 134.

Specifically, the excitation beam L1 provided by the excitation light source 110 is sequentially transmitted through the light splitting region 144_1 of the light splitting element 144 and the second region 134 of the region-based light splitter 130B corresponding to the light splitting region 144_1 to arrive at the wavelength converting element 120 (reflective wavelength conversion color wheel). At the time of blue light, the reflecting region in the wavelength converting element 120 reflects and transmits the excitation beam B1 through the other second region 134 of the region-based light splitter 130B to arrive at the semi-reflective region 144_2 of the light splitting element 144 corresponding to the other second region 134. With the semi-reflection of the semi-reflective region 144_2, a portion of the excitation beam L1 is reflected and transmitted by the semi-reflective region 144_2 to be sequentially transmitted through the light filtering element 160 and the light homogenizing element 170. Meanwhile, another portion of the excitation beam L1 passes through the semi-reflective region 144_2 and, through the reflection of the reflecting element 146, sequentially passes through the semi-reflective region 144_2 and/or the light splitting region 144_1 of the light splitting element 144, the light filtering element 160, and the light homogenizing element 170.

At the time of non-blue light, the region with the wavelength conversion material in the wavelength converting element 120 converts the excitation beam L1 and reflects the converted beam to emit the excited beam L2. The excited beam L2 is transmitted through the region-based light splitter 130B, and is sequentially transmitted through the light filtering element 160 and the light homogenizing element 170 after being reflected by the light splitting element 144.

At the time of non-blue light, a small portion of the excitation beam L1 transmitted to the wavelength converting element 120 is incident to the region with the wavelength conversion material but not excited. Therefore, the portion of the excitation beam L1 which is not excited and converted is reflected to pass through the focusing element 180A and transmitted to the first region 132 on the periphery of the region-based light splitter 130B at a large dispersion angle. Thus, the portion of the excitation beam L1 is reflected by the first region 132 and transmitted toward the wavelength converting element 120 again to be excited and converted. By doing so, the portion of the excitation beam L1 that is not excited and converted can be recycled, and the brightness of the excited beam L2 is increased. As a result, the conversion efficiency is facilitated, and the display effect is improved. In addition, the quarter-wave plate 150 shown in FIG. 2A may be omitted.

Figure 8A:
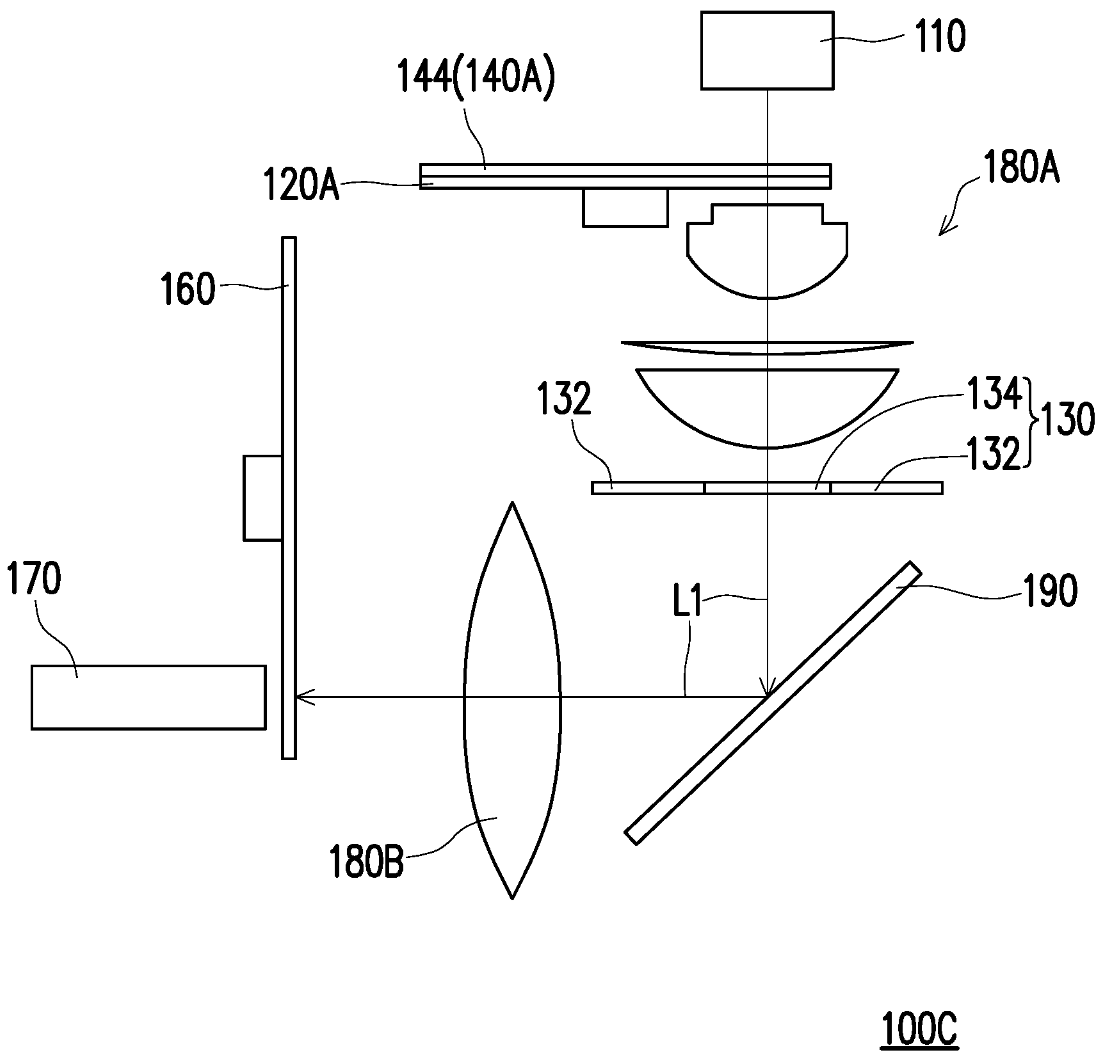
FIGS. 8A and 8B are respectively schematic views illustrating an illumination system according to another embodiment of the invention at different times.
Figure 8B:
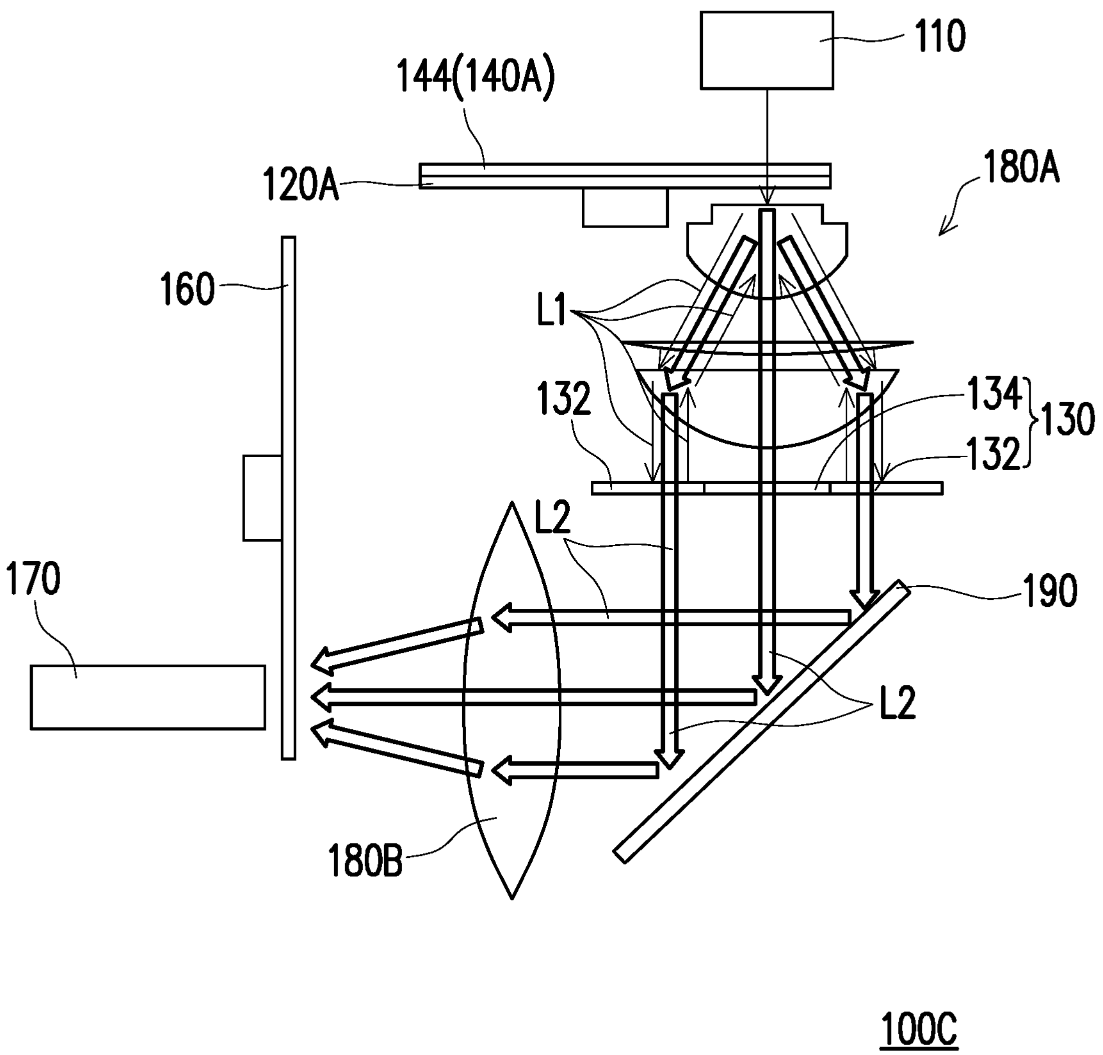

FIGS. 8A and 8B are respectively schematic views illustrating an illumination system according to another embodiment of the invention at different times. Referring to FIGS. 8A and 8B, an illumination system 100C of the embodiment is similar to the illumination system 100 shown in FIGS. 2A and 2B. However, the two differ in that, in the embodiment, the wavelength converting element 120A allows the excitation beam L1 to pass through, and the wavelength converting element 120A is disposed between the excitation light source 110 and the region-based light splitter 130. Specifically, in the embodiment, the wavelength converting element 120A is a transmissive wavelength conversion color wheel. What differs from the wavelength converting element 120 shown in FIG. 2A is that the wavelength converting element 120A includes, for example, a yellow light conversion region, a yellow-green light conversion region, and a transmissive region disposed on a transparent substrate. In the wavelength converting element 120A, the transmissive region replaces the reflective region, and the transmissive region may be, for example, a hollow region of the transparent substrate or a region with an anti-reflection film (not shown).

The light splitting assembly 140A includes the light splitting element 144 to allow the excitation beam L1 to pass through and reflects the excited beam L2. For example, the light splitting element 144 may be a dichroic mirror with yellow reflect (DMY), a dichroic mirror with green and orange reflect (DMGO), or a dichroic mirror with green and red reflect (DMGR). The light splitting element may be disposed in correspondence with the wavelength conversion material disposed in the wavelength converting element 120A. In the embodiment, the light splitting assembly 140A is formed on the wavelength converting element 120A and located between the excitation light source 110 and the wavelength converting element 120A to reduce the size of the illumination system 100C. However, the invention is not limited thereto. In addition, the illumination system 100C further includes the reflecting element 190 disposed on the transmission path of the excitation beam L1 and the transmission path of the excited beam L2 from the region-based light splitter 130 to reflect the excitation beam L1 and the excited beam L2.

Specifically, the excitation beam L1 provided by the excitation light source 110 is transmitted through the light splitting assembly 140A to arrive at the wavelength converting element 120A. At the time of blue light, the excitation beam L1 is sequentially transmitted through the transmissive region in the wavelength converting element 120A and the second region 134 located at the center of the region-based light splitter 130 to arrive at the reflecting element 190, and, through the reflection of the reflecting element 190, sequentially transmitted through the focusing element 180B, the light filtering element 160, and the light homogenizing element 170.

At the time of non-blue light, the region with the wavelength conversion material in the wavelength converting element 120A converts the excitation beam L1 and outputs the excited beam L2. That is, the excitation beam L1 is incident to one side of the wavelength converting element 120A, and the excited beam L2 is emitted from the opposite side of the wavelength converting element 120A. The excited beam L2 is transmitted through the first region 132 and the second region 134 of the region-based light splitter 130, and, through the reflection of the reflecting element 190, sequentially transmitted through the focusing element 180B, the light filtering element 160, and the light homogenizing element 170.

At the time of non-blue light, a small portion of the excitation beam L1 transmitted to the wavelength converting element 120A is incident to the region with the wavelength conversion material but not excited. Therefore, the portion of the excitation beam L1 which is not excited and converted is also emitted from the opposite side of the wavelength converting element 120A, transmitted through the focusing element 180A, and transmitted to the first region 132 on the periphery of the region-based light splitter 130 at a large dispersion angle. Thus, the portion of the excitation beam L1 is reflected by the first region 132 and transmitted toward the wavelength converting element 120A again to be excited and converted. By doing so, the portion of the excitation beam L1 that is not excited and converted can be recycled, and the brightness of the excited beam L2 is increased. As a result, the conversion efficiency is facilitated, and the display effect is improved. In addition, the quarter-wave plate 150 shown in FIG. 2A may be omitted.

Figure 9A:
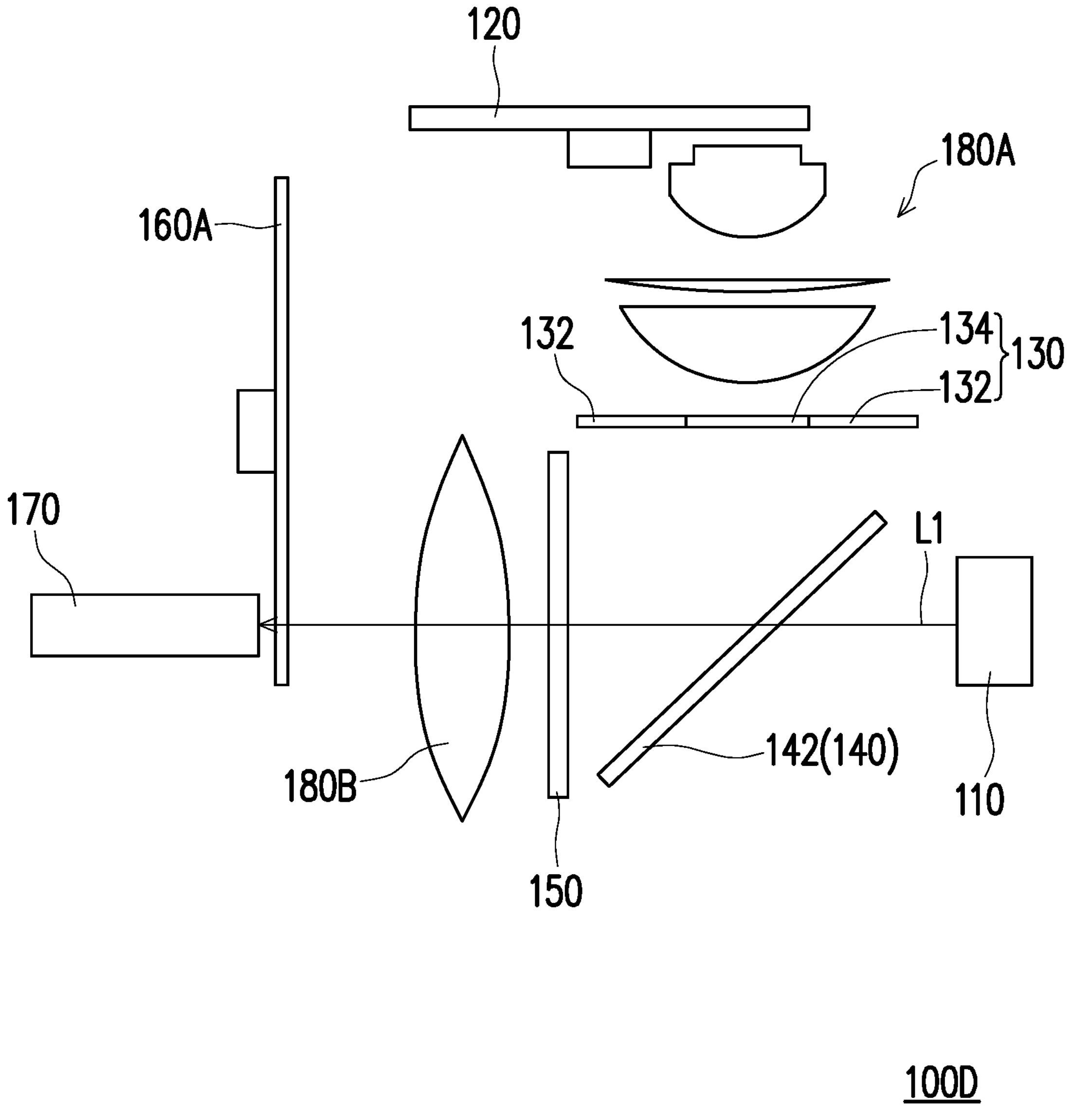
FIGS. 9A and 9B are respectively schematic views illustrating an illumination system according to another embodiment of the invention at different times.
Figure 9B:
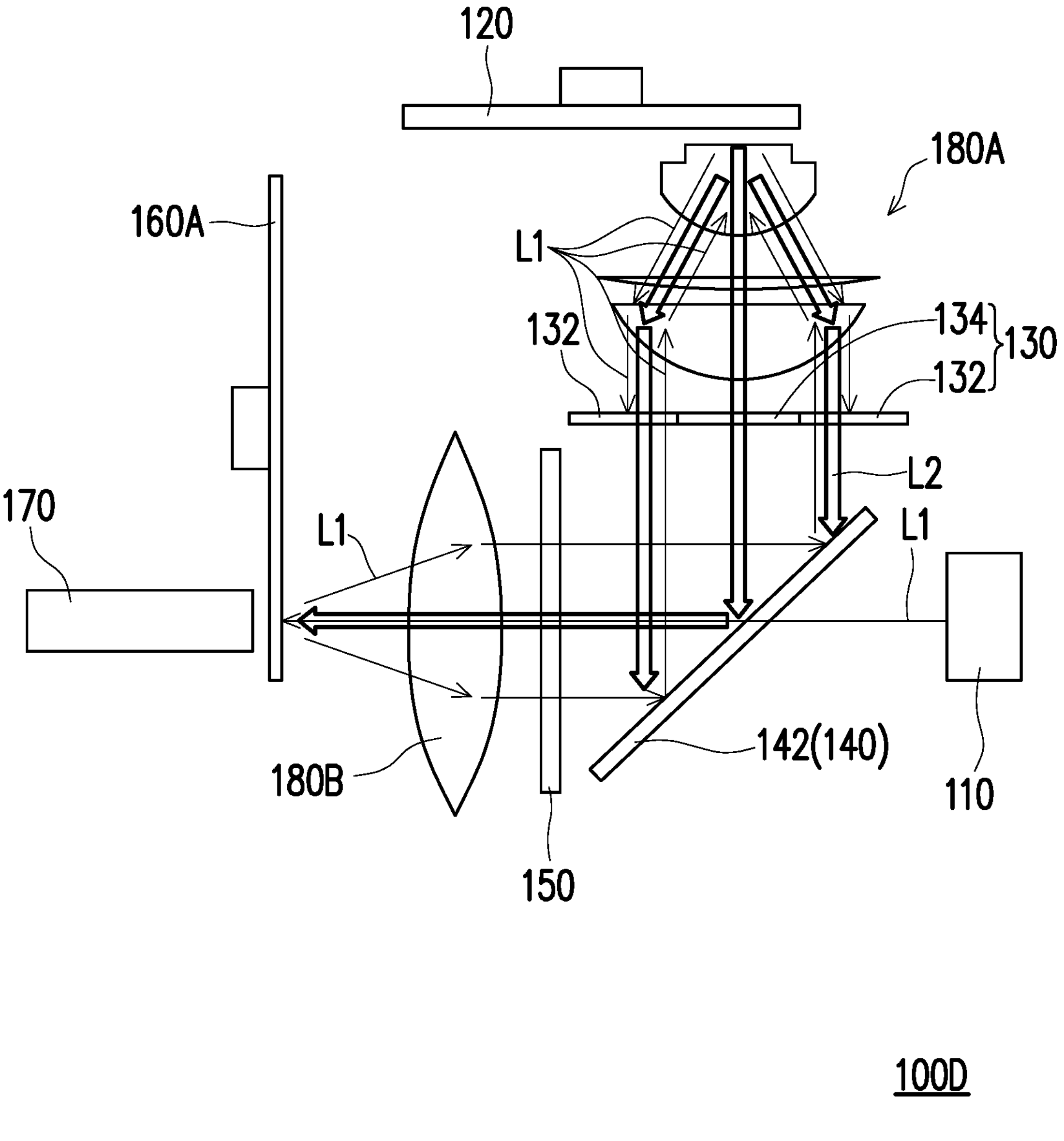

FIGS. 9A and 9B are respectively schematic views illustrating an illumination system according to another embodiment of the invention at different times. Referring to FIGS. 9A and 9B, an illumination system 100D of the embodiment is similar to the illumination system 100 shown in FIGS. 2A and 2B. However, the two differ in that the position where the excitation light source 110 is disposed is different in the embodiment. Specifically, the light splitting assembly 140 is located between the light homogenizing element 170 and the excitation light source 110, and the region-based light splitter 130 is located between the light splitting assembly 140 and the wavelength converting element 120. In addition, a light filtering element 160A includes a non-blue light region and a blue light region (not shown). The non-blue light region is provided for the excited beam L2 to pass through and reflect beams of other colors, whereas the blue light region is provided for the excitation beam L1 to pass through and reflect beams of other colors. In addition, the blue light region and the non-blue light region of the light filtering element 160A are respectively switched onto the transmission path of the excitation beam L1 at the time of blue light and at the time of non-blue light. In addition, the light splitting assembly 140 of the embodiment includes a polarization light splitting element 142. The polarization light splitting element 142 allows a P-polarized beam to pass through and reflect other beams. In the embodiment, the wavelength conversion material may be arranged in an O-shaped region on the wavelength converting element 120.

At the time of blue light, the P-polarized excitation beam L1 provided by the excitation light source 110 may be sequentially transmitted through the light splitting assembly 140, the quarter-wave plate 150, the focusing element 180B, and the blue light region of the light filtering element 160A to arrive at the light homogenizing element 170.

At the time of non-blue light, the P-polarized excitation beam L1 provided by the excitation light source 110 is sequentially transmitted through the light splitting assembly 140 and the quarter-wave plate 150 to form the circularly polarized excitation beam L1. The circularly polarized excitation beam L1 is reflected by the non-blue light region of the light filtering element 160A to be transmitted through the quarter-wave plate 150 again to form the S-polarized excitation beam L1. Through the reflection of the light splitting assembly 140, the S-polarized excitation beam L1 is sequentially transmitted to the second region 134 of the region-based light splitter 130 and the focusing element 180A to arrive at the wavelength converting element 120 (reflective wavelength conversion color wheel). The region with the wavelength conversion material in the wavelength converting element 120 converts the excitation beam L1 and reflects the converted beam to emit the excited beam L2. The excited beam L2 may be transmitted through the first region 132 and the second region 134 of the region-based light splitter 130, and may be sequentially transmitted through the quarter-wave plate 150, the non-blue light region of the light filtering element 160A, and the light homogenizing element 170 after being reflected by the light splitting assembly 140.

At the time of non-blue light, a small portion of the excitation beam L1 transmitted to the wavelength converting element 120 is incident to the region with the wavelength conversion material but not excited. Therefore, the portion of the excitation beam L1 which is not excited and converted is reflected to pass through the focusing element 180A and transmitted to the first region 132 on the periphery of the region-based light splitter 130 at a large dispersion angle. Thus, the portion of the excitation beam L1 is reflected by the first region 132 and transmitted toward the wavelength converting element 120 again to be excited and converted. By doing so, the portion of the excitation beam L1 that is not excited and converted can be recycled, and the brightness of the excited beam L2 is increased. As a result, the conversion efficiency is facilitated, and the display effect is improved.

Based on the above, in the illumination system and the projection apparatus according to the embodiments of the invention, the illumination system includes the excitation light source, the wavelength converting element, and the region-based light splitter. The region-based light splitter is disposed on the transmission path of the excitation beam, and includes at least one first region and at least one second region. The first region reflects the excitation beam and allows the excited beam to pass through, whereas the second beam allows the excitation beam and the excited beam to pass through. The excitation beam reflected by the region-based light splitter is transmitted toward the wavelength converting element. Therefore, when the excitation beam provided by the excitation light source is transmitted to the wavelength converting element but is not converted into the excited beam, the portion of the excitation beam which is not excited and converted passes through the focusing element and is transmitted to the first region located in the region-based light splitter at a large dispersion angle. Thus, the portion of the excitation beam is reflected by the first region and transmitted toward the wavelength converting element again to be excited and converted. By doing so, the portion of the excitation beam that is not excited and converted can be recycled, and the brightness of the excited beam is increased. As a result, the conversion efficiency is facilitated, and the display effect is improved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term “the invention”, “the present invention” or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use “first”, “second”, etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, comprising: an excitation light source, a wavelength converting element, a region-based light splitter, a light splitting assembly and a quarter-wave plate wherein:

the excitation light source provides an excitation beam, the wavelength converting element is disposed on a transmission path of the excitation beam to convert the excitation beam into an excited beam, the region-based light splitter is disposed on the transmission path of the excitation beam and comprises at least one first region and at least one second region, the at least one first region reflects the excitation beam and allows the excited beam to pass through, the at least one second region allows the excitation beam and the excited beam to pass through, and the excitation beam reflected by the region-based light splitter is transmitted toward the wavelength converting element, the light splitting assembly is disposed on a transmission path of the excited beam to reflect the excited beam, and the quarter-wave plate is disposed on the transmission path of the excitation beam to convert a polarizing direction of the excitation beam, wherein the light splitting assembly comprises a polarization light splitting element.

2. The illumination system as claimed in claim 1, wherein a number of the at least one first region of the region-based light splitter is one, the at least one second region is located at a center position of the region-based light splitter, and the first region surrounds the at least one second region.

3. The illumination system as claimed in claim 1, wherein a number of the at least one second region of the region-based light splitter is two, the two second regions are symmetric to a geometric symmetric axis of the region-based light splitter, and the at least one first region surrounds the two second regions.

4. The illumination system as claimed in claim 1, wherein the region-based light splitter is rectangular, a number of the at least one first region is two, a number of the at least one second region is one, and the second region is located between the two first regions.

5. The illumination system as claimed in claim 1, wherein the region-based light splitter is located between the excitation light source and the wavelength converting element.

6. The illumination system as claimed in claim 1, wherein the region-based light splitter is integrally formed with the quarter-wave plate.

7. A projection apparatus, comprising an illumination system, at least one light valve, and a projection lens, wherein:

the illumination system provides an illumination beam and comprises an excitation light source, a wavelength converting element, a region-based light splitter, a light splitting assembly and a quarter-wave plate, wherein:

the excitation light source provides an excitation beam, the wavelength converting element is disposed on a transmission path of the excitation beam to convert the excitation beam into an excited beam, the region-based light splitter is disposed on the transmission path of the excitation beam and comprises at least one first region and at least one second region, the at least one first region reflects the excitation beam and allows the excited beam to pass through, the at least one second region allows the excitation beam and the excited beam to pass through, the excitation beam reflected by the region-based light splitter is transmitted toward the wavelength converting element, and the illumination beam comprises the excitation beam and the excited beam, the light splitting assembly is disposed on a transmission path of the excited beam to reflect the excited beam, and the quarter-wave plate is disposed on the transmission path of the excitation beam to convert a polarizing direction of the excitation beam, wherein the light splitting assembly comprises a polarization light splitting element, the at least one light valve is disposed on a transmission path of the illumination beam to convert the illumination beam into an image beam, and the projection lens is disposed on a transmission path of the image beam and projects the image beam out of the projection apparatus.

8. The projection apparatus as claimed in claim 7, wherein a number of the at least one first region of the region-based light splitter is one, the at least one second region is located at a center position of the region-based light splitter, and the first region surrounds the at least one second region.

9. The projection apparatus as claimed in claim 7, wherein a number of the at least one second region is two, the two second regions are symmetric to a geometric symmetric axis of the region-based light splitter, and the at least one first region surrounds the two second regions.

10. The projection apparatus as claimed in claim 7, wherein the region-based light splitter is rectangular, a number of the at least one first region is two, a number of the at least one second region is one, and the second region is located between the two first regions.

11. The projection apparatus as claimed in claim 7, wherein the region-based light splitter is located between the excitation light source and the wavelength converting element.

12. The projection apparatus as claimed in claim 7, wherein the region-based light splitter is integrally formed with the quarter-wave plate.

13. The projection apparatus as claimed in claim 7, wherein the illumination system further comprises a reflecting element disposed on the transmission path of the excitation beam and a transmission path of the excited beam and reflecting the excitation beam and the excited beam, wherein the wavelength converting element is a transmissive optical element.

14. An illumination system, comprising: an excitation light source, a wavelength converting element, a region-based light splitter and a light splitting assembly, wherein:

the excitation light source provides an excitation beam, the wavelength converting element is disposed on a transmission path of the excitation beam to convert the excitation beam into an excited beam, the region-based light splitter is disposed on the transmission path of the excitation beam and comprises at least one first region and at least one second region, the at least one first region reflects the excitation beam and allows the excited beam to pass through, the at least one second region allows the excitation beam and the excited beam to pass through, and the excitation beam reflected by the region-based light splitter is transmitted toward the wavelength converting element, and the light splitting assembly is disposed on a transmission path of the excited beam to reflect the excited beam, wherein the wavelength converting element allows the excitation beam to pass through, and the light splitting assembly comprises a light splitting element allowing the excitation beam to pass through and reflecting the excited beam.

15. A projection apparatus, comprising an illumination system, at least one light valve and a projection lens, wherein:

the illumination system provides an illumination beam and comprises an excitation light source, a wavelength converting element, a region-based light splitter and a light splitting assembly, wherein:

the excitation light source provides an excitation beam, the wavelength converting element is disposed on a transmission path of the excitation beam to convert the excitation beam into an excited beam, the region-based light splitter is disposed on the transmission path of the excitation beam and comprises at least one first region and at least one second region, the at least one first region reflects the excitation beam and allows the excited beam to pass through, the at least one second region allows the excitation beam and the excited beam to pass through, the excitation beam reflected by the region-based light splitter is transmitted toward the wavelength converting element, and the illumination beam comprises the excitation beam and the excited beam, and the light splitting assembly is disposed on a transmission path of the excited beam to reflect the excited beam, wherein the wavelength converting element allows the excitation beam to pass through, and the light splitting assembly comprises a light splitting element allowing the excitation beam to pass through and reflecting the excited beam, the at least one light valve is disposed on a transmission path of the illumination beam to convert the illumination beam into an image beam, and the projection lens is disposed on a transmission path of the image beam and projects the image beam out of the projection apparatus.

16. An illumination system, comprising: an excitation light source, a wavelength converting element, a region-based light splitter and a reflecting element, wherein:

the excitation light source provides an excitation beam, the wavelength converting element is disposed on a transmission path of the excitation beam to convert the excitation beam into an excited beam, the region-based light splitter is disposed on the transmission path of the excitation beam and comprises at least one first region and at least one second region, the at least one first region reflects the excitation beam and allows the excited beam to pass through, the at least one second region allows the excitation beam and the excited beam to pass through, and the excitation beam reflected by the region-based light splitter is transmitted toward the wavelength converting element, and the reflecting element is disposed on the transmission path of the excitation beam and a transmission path of the excited beam and reflecting the excitation beam and the excited beam, wherein the wavelength converting element is a transmissive optical element.

17. An illumination system, comprising: an excitation light source, a wavelength converting element, a region-based light splitter and a light splitting assembly, wherein:

the excitation light source provides an excitation beam, the wavelength converting element is disposed on a transmission path of the excitation beam to convert the excitation beam into an excited beam, the region-based light splitter is disposed on the transmission path of the excitation beam and comprises at least one first region and at least one second region, the at least one first region reflects the excitation beam and allows the excited beam to pass through, the at least one second region allows the excitation beam and the excited beam to pass through, and the excitation beam reflected by the region-based light splitter is transmitted toward the wavelength converting element, and the light splitting assembly is disposed on a transmission path of the excited beam to reflect the excited beam, wherein the light splitting assembly comprises a light splitting element and a reflecting element, the light splitting element comprises a light splitting region and a semi-reflective region adjacent to the light splitting region, the light splitting region of the light splitting element allows the excitation beam to pass through and reflects the excited beam, the semi-reflective region of the light splitting element allows a portion of the excitation beam to pass through, reflects another portion of the excitation beam, and reflects the excited beam, and the reflecting element reflects an arbitrary beam transmitted through the semi-reflective region, wherein a number of the at least one second region of the region-based light splitter is two, and the light splitting region and the semi-reflective region of the light splitting element respectively correspond to the two second regions of the region-based light splitter.

18. A projection apparatus, comprising an illumination system, at least one light valve, and a projection lens, wherein:

the illumination system provides an illumination beam and comprises an excitation light source, a wavelength converting element, a region-based light splitter and a light splitting assembly, wherein:

the excitation light source provides an excitation beam, the wavelength converting element is disposed on a transmission path of the excitation beam to convert the excitation beam into an excited beam, the region-based light splitter is disposed on the transmission path of the excitation beam and comprises at least one first region and at least one second region, the at least one first region reflects the excitation beam and allows the excited beam to pass through, the at least one second region allows the excitation beam and the excited beam to pass through, the excitation beam reflected by the region-based light splitter is transmitted toward the wavelength converting element, and the illumination beam comprises the excitation beam and the excited beam, and the light splitting assembly is disposed on a transmission path of the excited beam to reflect the excited beam, wherein the light splitting assembly comprises a light splitting element and a reflecting element, the light splitting element comprises a light splitting region and a semi-reflective region adjacent to the light splitting region, the light splitting region of the light splitting element allows the excitation beam to pass through and reflects the excited beam, the semi-reflective region of the light splitting element allows a portion of the excitation beam to pass through, reflects another portion of the excitation beam, and reflects the excited beam, and the reflecting element reflects an arbitrary beam transmitted through the semi-reflective region, wherein a number of the at least one second region of the region-based light splitter is two, and the light splitting region and the semi-reflective region of the light splitting element respectively correspond to the two second regions of the region-based light splitter, the at least one light valve is disposed on a transmission path of the illumination beam to convert the illumination beam into an image beam, and the projection lens is disposed on a transmission path of the image beam and projects the image beam out of the projection apparatus.

* * * * *